United States Patent [19]

Markel et al.

[11] Patent Number: 4,863,279

[45] Date of Patent: Sep. 5, 1989

[54] OPERATIVE TEMPERATURE SENSING SYSTEM

[75] Inventors: Morris L. Markel, 246 Doncaster Rd., Kenmore, N.Y. 14217; Albert F. Glassman, Grand Island, N.Y.

[73] Assignee: Morris L. Markel, Kenmore, N.Y.

[21] Appl. No.: 158,690

[22] Filed: Feb. 22, 1988

[51] Int. Cl.[4] .................... G01K 3/02; G01K 13/00
[52] U.S. Cl. .................... 374/109; 374/115; 374/121; 374/163; 340/584
[58] Field of Search ............ 374/109, 115, 166, 133, 374/183; 236/91 E, 91 G; 350/630

[56] References Cited

U.S. PATENT DOCUMENTS

| | | | |
|---|---|---|---|
| 2,603,422 | 7/1952 | Sargeaunt | 236/91 |
| 2,685,795 | 8/1954 | Hardy et al. | 73/170 |
| 2,737,809 | 3/1956 | Fastie | 374/129 X |
| 2,739,204 | 3/1956 | Garner et al. | 200/140 |
| 3,062,941 | 11/1962 | White | 219/20 |
| 3,091,957 | 6/1963 | Hampton | 73/27 |
| 3,092,997 | 6/1963 | Gaskill . | |
| 3,246,838 | 4/1966 | Bauer | 236/36 |
| 3,266,313 | 8/1966 | Litterst | 350/630 X |
| 3,531,991 | 10/1970 | Strong et al. . | |
| 4,024,725 | 5/1977 | Uchida et al. | 236/91 G X |
| 4,058,254 | 11/1977 | Hallgreen | 236/68 |
| 4,068,138 | 1/1978 | Miyakawa et al. | 307/262 |
| 4,073,190 | 2/1978 | MacHattie et al. | 73/339 |
| 4,109,196 | 8/1978 | Carmody | 324/62 |
| 4,123,939 | 11/1978 | Maples et al. . | |
| 4,130,019 | 12/1978 | Nitschke | 73/341 |
| 4,164,869 | 8/1979 | Benzinger . | |
| 4,181,957 | 1/1980 | Pinckaers | 364/557 |
| 4,297,851 | 11/1981 | Paddock et al. | 62/126 |
| 4,301,682 | 11/1981 | Everest | 73/355 |
| 4,433,923 | 2/1984 | Rascati et al. | 374/112 |
| 4,592,661 | 6/1986 | Wilson | 374/109 X |

OTHER PUBLICATIONS

Publ. "Wet Globe Thermometer", Howard Engineering Co., Bethlehem, Pa., Jun. 1970, Three (3) pp.
Publ. "Thermal Environmental Conditions for Human Occupancy", ANSI/ASHRAE 55-1981, pp. 1-15.
Publ. "Solarware Globe Thermometer Systems", Solarware Inc., Vermont 1969, Four (4) pp.

Primary Examiner—Daniel M. Yasich
Attorney, Agent, or Firm—Joseph P. Gastel

[57] ABSTRACT

An operative temperature sensing system including a first circuit including an air temperature sensor for providing a first signal which is a function of the air temperature within a room, a second circuit which provides a second signal which is a function of the mean radiant temperature within a room, and a third circuit for providing an output signal which is a function of the average of the first and second signals which in turn is a direct function of the operative temperature.

13 Claims, 1 Drawing Sheet

OPERATIVE TEMPERATURE SENSING SYSTEM

BACKGROUND OF THE INVENTION

The present invention relates to an operative temperature sensing system and more particularly to such a system that accurately, simply and inexpensively senses (for indication and/or control purposes) the operative temperature which closely approximates the thermal environmental sensing capabilities of a human being. Operative temperature is the uniform temperature of a radiantly black enclosure in which an occupant would exchange the same amount of heat by radiation plus convection, as in the actual nonuniform environment.

By way of background, a person generates or loses heat by conduction, convection and radiation. When a person is thermally neutral, the heat loss from the person equals the heat gain, and when this situation exists, a person is comfortable. Therefore, when there is a knowledge of what the operative temperature should be, a person's environment can be adjusted so that the above-expressed equilibrium is maintained. In order to adjust the environment there are certain factors which have to be taken into consideration, namely, the radiant convection and conduction heat transfer by which a person is losing or gaining heat or, in other words, the heat transfer between a human body and its environment.

Considering the foregoing still further, a heating, ventilating and cooling system has two purposes. The first is to maintain a person's comfort during the time that a room is occupied. The second is to maintain the integrity of the materials of a structure during unoccupied time. This means that all that is necessary when a room is unoccupied is to maintain the air temperature therein sufficiently high so that there is no damage due to freezing, or the like or, to maintain the temperature sufficiently low so that there is no mildewing. For example, an unoccupied room should normally not be maintained at an air temperature below 13° C. and obviously should not exceed an air temperature of about 35° C. Thus for optimum heating and cooling efficiency, for example, when a room is unoccupied in cold weather, the room can be at an air temperature of 13° C. However, as soon as the room becomes occupied, the temperature should be raised to an acceptable operative temperature of approximately 20° C. for comfort. Thus, when a room is unoccupied and maintained at 13° C., heat loss is maintained at a practical minimum. However, once it becomes occupied, it is desirable to raise the temperature to 20° C. operative temperature, for example, within a 15-20 minute period.

In existing heating systems utilizing hot air or hot water, the air temperature is raised by convection. However, human comfort can be realized in a much shorter time period by the use of radiant heat transfer alone, or in combination with the foregoing type of heat. Thus, when a person enters a room shortly after a radiation heating system has been energized, the person will feel the comfort from the radiant heat almost immediately, and the air temperature will be increased incidental to the radiant heating until both are of the required value to both maintain human comfort and also warm the various structures, such as tables, desks and chairs, with which humans come into contact. Thus, when radiant heat is used, there is practically no time delay in achieving human comfort even though the room temperature was well below the comfort level immediately before the radiant heat source was energized.

In U.S. Pat. No. 4,433,923 dated Feb. 28, 1984 and assigned to the present inventor, an operative temperature sensing system is disclosed which is based on the measurement of globe temperature and air temperature and which provides an output for control purposes. However, in the operative temperature sensing system which relies on the globe temperature, the operative temperature is expressed by the equation:

$$T_o = AT_g + (1-A)T_a$$

In the above equation, $T_o$ is the operative temperature, $T_g$ is the globe temperature, $T_a$ is the air temperature, and A is a weighing factor. The weighing factor for a globe thermometer of 1½ inch diameter has been calculated as 1.28 and thus in the patent the equation for operative temperature becomes:

$$T_o = 1.28 T_g - 0.28 T_a$$

It has been found, however, that there is an inherent problem in using the output of a globe thermometer ($T_g$) to calculate $T_o$ in the above equation. Under certain circumstances, because of its inherent long time constant in relation to $T_a$, it causes the measured $T_o$ to produce an error signal when none is necessary because the $T_a$ response is faster than the $T_g$ response. From the above formula it is seen that the measured $T_o$ will decrease if $T_a$ increases while $T_g$ does not increase as rapidly in the heating mode, and it will increase if $T_a$ decreases and $T_g$ does not decrease as rapidly in the cooling mode. However, the foregoing calculation of $T_o$ in the above formula is directly opposite to what is desired because the actual air temperature is already higher than desired in the heating mode and its lower than desired in the cooling mode. Thus, when the erroneous $T_o$ calculated from the above equation is matched against a predetermined set point temperature, as expressed in the above patent, the signal will call for more heat when none is required and will call for more cooling when none is required. Thus there is a problem in using the above equation for providing an output of operative temperature which is matched against a predetermined set point temperature.

SUMMARY OF THE INVENTION

It is accordingly the primary object of the present invention to provide a reading of operative temperature which is based directly on air temperature and mean radiant temperature, thereby eliminating the above shortcomings of a system which relies on a globe thermometer. Other objects and attendant advantages of the present invention will readily be perceived hereafter.

The present invention relates to an operative temperature sensing system wherein operative temperature is the uniform temperature of a radiantly black enclosure in which an occupant would exchange the same amount of heat by radiation plus convection as in the actual nonuniform environment comprising first temperature sensing means for generating a first signal having a value which is a function of the air temperature within an enclosed space, second temperature sensing means for generating a second signal having a value which is a function of the mean radiant temperature, first and second signal modifying circuit means for modifying said first and second signals for providing a third signal which has a value which is the average of the sum of said first and second signals and thus is a function of the operative temperature within said enclosed space.

The various aspects of the present invention will be more fully understood when the following portions of the specification are read in conjunction with the accompany drawings wherein:

DESCRIPTION OF THE PREFERRED EMBODIMENTS

As indicated in the above-mentioned patent No. 4,433,923, a basic formula for operative temperature is as follows:

$$T_o = (H_c T_a + H_r T_r)(H_c + H_r)$$

wherein:
$T_o$ = operative temperature
$T_a$ = air or ambient temperature
$T_r$ = mean radiant temperature
$H_c$ = convective heat transfer coefficient
$H_r$ = radiative heat transfer coefficient.

Stated otherwise, the foregoing formula can be rewritten as follows:

$$t_o = \frac{h_c}{h_c + h_r}(t_a) + \frac{h_r}{h_c + h_r}(t_r)$$

wherein:
$h_c$ = convection coefficient
$h_r$ = radiation coefficient
$t_a$ = dry bulb temperature
$t_r$ = mean radiant temperature
However it has been found that the quantity $$\frac{h_c}{h_c + h_r} = .5$$

where the air velocity in a room is less than 0.4 m/s at 20° C. It has also been found that $$\frac{h_r}{h_c + h_r}$$

is also equal to 0.5 where the air velocity in a room is less than 0.4 m/s at 20° C. Therefore, substituting in the above formula, we get:

$$t_o = 0.5 t_a + 0.5 t_r$$

which is stated otherwise as:

$$t_o = \frac{t_a + t_r}{2}$$

All of the above values are expressed in degrees Celsius. In essence therefore the last formula indicates that the operative temperature is the average of the sum of the air temperature and mean radiant temperature. As can be seen from the second last equation immediatey above, the operative temperature is the sum of the halves of the air temperature and the mean radiant temperature.

In accordance with the present invention, operative temperature can thus be obtained by direct measurement of the air temperature and mean radiant temperature to thereby obviate the shortcoming of the above-discussed system of the prior patent. The mean radiant temperature can be measured directly by a specialized infrared detector which includes a thermister, resistance temperature detector (RTD), thermocouple or thermopile, as more fully described hereafter.

Figure 1:
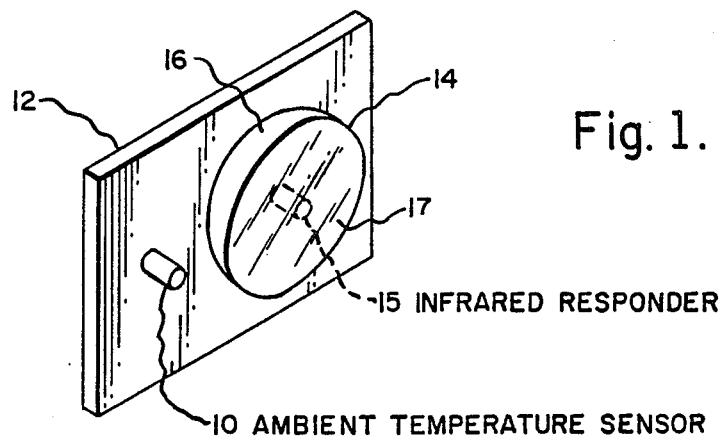
FIG. 1 is a diagrammatic representation of the air temperature sensor and a sensor for measuring mean radiant temperature directly.

The sensing system of the present invention includes an air or ambient temperature sensor 10 (FIG. 1) which senses $t_a$ in an enclosure such as a room. Sensor 10, which may be a thermister, thermocouple, thermopile or a resistance temperature detector, may be suitably mounted on a base or support 12, and it is located adjacent to a infrared detector 14 which is mounted on said base or support 12. The base 12 is mounted on any surface of a room, such as a wall or ceiling. Infrared detector 14 provides a direct reading of the mean radiant temperature in the enclosure or room in which the device is located. Infrared detector 14 includes a responder 15 located within a concave reflector 16, and a cover 17 which is capable of transmitting infrared waves extends across the opening of the reflector 16 so that responder 15 is located within a totally enclosed chamber. Cover 17 may be made of polyethylene. Responder 15 itself may be identical to the ambient temperature sensor 10, that is, it may be a thermister, thermocouple, thermopile or a resistance temperature detector. The cover 17 permits passage of infrared rays into the enclosed chamber to impinge directly onto responder 15, and the concave reflector also reflects infrared rays passing through cover 17 onto responder 15. Because reflector 16 is concave, it will reflect infrared rays from the entire room onto responder 15, that is, it will reflect those rays onto responder 15 which originate from surfaces within its view because it is essentially a wide angle optical system.

According to the present invention, the air temperature $t_a$ and the main radiant temperature $\bar{t}_r$, are suitably processed and combined so that an output signal is developed which is a function of the operative temperature $t_o$.

Figure 2:
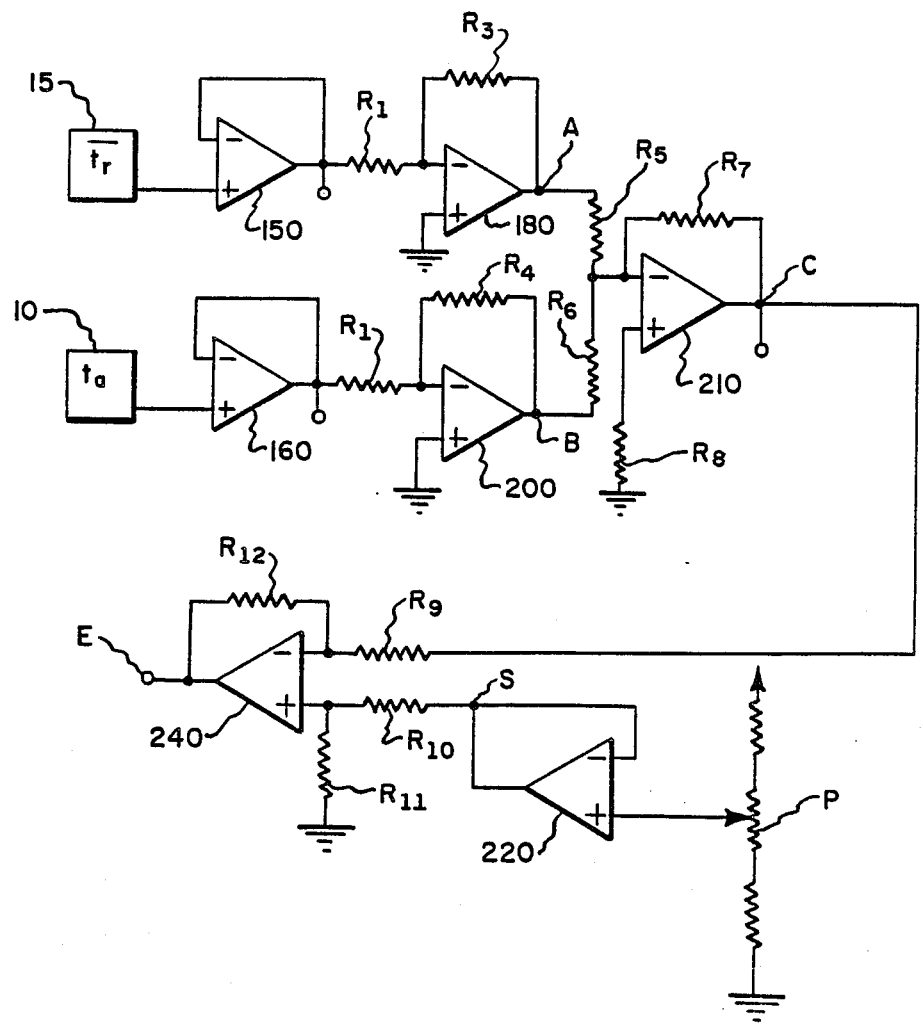
FIG. 2 is a circuit diagram of the electronic components for developing an output signal indicative of operative temperature from the sensors illustrated in FIG. 1.

Referring to FIG. 2, the air temperature sensor 10 which senses $t_a$ is schematically represented at 10 and the mean radiant temperature sensor 15 which senses $\bar{t}_r$ is represented at 15. The signal $\bar{t}_r$ from 15 and the signal $t_a$ from 10 are suitably amplified by amplifiers 150 and 160, respectively, which may be high impedance buffer amplifiers which allow the high output impedance of the temperature sensors to be inputed to the remaining control circuitry. The outputs from amplifiers 150 and 160, which are representative of $\bar{t}_r$ and $t_a$, respectively, are fed through series resistors $R_1$ to second amplifiers 180 and 200, respectively. Feedback resistors $R_3$ and $R_4$ are provided across amplifiers 180 and 200, respectively, such that the output signal of amplifier 180 at point A is equal to $(R_3/R_1)\bar{t}_r$ and the output signal of amplifier 200 at point B is equal to $(R_4/R_1)t_a$. It should be apparent that $R_3/R_1$ and amplifier 180 and $R_4/R_1$ and amplifier 200 function as modifying circuit means for the signal from mean radiant temperature sensor 15 and air sensor 10, respectively. These signals are fed into amplifier 210 where they are added which results in an output signal at point C which is equal to $(R_3/R_1)\bar{t}_r + (R_4/R_1)t_a$, the values of resistors $R_5$, $R_6$, $R_7$ and $R_8$ all being equal to each other. It should thus be readily apparent that the proper choice of the values or range of values of $R_1$, $R_3$ and $R_4$ will result in a signal at point C that is a function of the operative temperature $t_o$, that is, a value which is the function of the average of the signals $t_a$ and $\bar{t}_r$ at 10 and 15. The foregoing portion of the circuit shown in FIG. 2 differs from that shown in patent No. 4,433,923 because the signals at A and B are added whereas in the patent they are subtracted which results in the abovediscussed shortcoming.

The signal at point C then may be compared to a set point reference signal at point S, which is suitably developed by a variable potentiometer P and an amplifier 220, to determine the difference in value between $t_o$ and a set point temperature at point S for control and/or indication purposes. To this end the signals at point C and point S are fed into a comparative amplifier 240 through resistors $R_9$ and $R_{10}$, respectively, to generate an error signal at point E indicative of the difference therebetween. Thus, the signal at point E is equal to the algebraic sum of the signals at point S and point C. The resistors $R_9$, $R_{10}$, $R_{11}$ and $R_{12}$ may be of equal value.

The values for the various resistors for a representative circuit are as follows:

| | |
|---|---|
| $R_1 = 100K$ | $R_8 = 50K$ |
| $R_3 = 1M$ | $R_9 = 100K$ |
| $R_4 = 1M$ | $R_{10} = 100K$ |
| $R_5 = 100K$ | $R_{11} = 150K$ |
| $R_6 = 100K$ | $R_{12} = 50K$ |
| $R_7 = 100K$ | |

Amplifiers 150, 160, 180, 200, 210, 220 and 240 are preferably of the operational type. The temperature sensing unit 10 may be of the thermister, resistance temperature detector (RTD), thermocouple or thermopile type. All temperatures used in the foregoing formulas are in degrees Celsius. It will be appreciated that the foregoing values can be changed as required for different choices of operational amplifiers and output requirements within the scope of the present invention.

The reason that the above equation can be used is because the temperatures $t_a$ and $\bar{t}_r$ are read directly thereby overcoming the above-discussed deficiency of a globe thermometer. More specifically, the globe thermometer reads the temperature in a chamber which is affected by the absorbivity of the shell, and thus there is the above-discussed time-lag which gives rise to errors, whereas the present infrared detector receives infrared waves directly, therby avoiding the losses encountered with the globe thermometer.

While a preferred embodiment of the present invention has been disclosed, it will readily be appreciated that the present invention is not limited thereto but may be otherwise embodied within the scope of the following claims.

What is claimed is:

1. An operative temperature sensing system for providing an output which is a function of the operative temperature which is the uniform temperature of a radiantly black enclosure in which an occupant would exchange the same amount of heat by radiation plus convection as in the actual nonuniform environment comprising first temperature sensing means for generating a first signal having a value which is a function of the air temperature within said nonuniform environment, second temperature sensing means for generating a second signal having a value which is derived from a direct reading of and is a function of the mean radiant temperature in said nonuniform environment, and signal modifying circuit means for modifying said first and second signals for providing a third signal which has a value which is a function of the average of the sum of said first and second signals and thus is a function of the operative temperature within said nonuniform environment.

2. An operative temperature sensing system as set forth in claim 1 wherein said second temperature sensing mean comprises a responder which responds directly to mean radiant temperature and which is located within a chamber, a cover on said chamber for transmitting infrared waves therethrough from said nonuniform environment directly to said responder, and a reflector forming part of said chamber for reflecting infrared waves onto said responder.

3. An operative temperature sensing system as set forth in claim 1 wherein said signal modifying means include first signal modifying means for providing an output which is representative of half of said first signal, second circuit modifying means for providing an output which is representative of half of said second signal, and third circuit means for adding said outputs which are representative of said halves of said first and second signals.

4. An operative temperature sensing system as set forth in claim 3 wherein said second temperature sensing means comprises a responder which responds directly to mean radiant temperature and which is located within a chamber, a cover on said chamber for transmitting infrared waves therethrough from said nonuniform environment directly to said responder, and a reflector forming part of said chamber for reflecting infrared waves onto said responder.

5. An operative temperature sensing system as set forth in claim 3 wherein said first temperature sensing means is located adjacent to said second temperature sensing means.

6. An operative temperature sensing system as set forth in claim 1 wherein said signal modifying circuit means include an amplifier for adding said first and second signals.

7. An operative temperature sensing system as set forth in claim 6 wherein said second temperature sensing means comprises a responder which responds directly to mean radiant temperature and which is located within a chamber, a cover on said chamber for transmitting infrared waves therethrough from said nonuniform environment directly to said responder, and a reflector forming part of said chamber for reflecting infrared waves onto said responder.

8. An operative temperature sensing system as set forth in claim 1 including a set point reference signal generating means for developing a fourth signal that is a function of a desired set point temperature, and means responsive to said third signal and said fourth signal for developing an error signal that is a function of the difference therebetween.

9. An operative temperature sensing system as set forth in claim 8 wherein said second temperature sensing means comprises a responder which responds directly to mean radiant temperature and which is located within a chamber, to cover on said chamber for transmitting infrared waves therethrough from said nonuniform environment directly to said responder, and a reflector forming part of said chamber for reflecting infrared waves onto said responder.

10. An operative temperature sensing system as set forth in claim 1 wherein said second temperature sensing means comprises an infrared detector.

11. An operative temperature sensing system as set forth in claim 10 including set point reference signal generating means for developing a fourth signal which is a function of a desired set point temperature, and means responsive to said third signal and said fourth signal for developing an error signal which is a function of the difference therebetween.

12. An operative temperature sensing system as set forth in claim 11 wherein said infrared detector comprises a responder which senses mean radiant temperature and is located within a chamber, a cover on said chamber for transmitting infrared rays therethrough from said nonuniform environment directly to responder, and a reflector forming part of said chamber for reflecting infrared waves passing through said cover onto said responder.

13. A method of providing a signal which is the difference between a set point representing the desired operative temperature and the measured operative temperature within a nonuniform environment comprising the steps of measuring the air temperature within said nonuniform environment, producing a first signal from said measurement of said air temperature which is a function of said air temperature, measuring directly the mean radiant temperature within aid nonuniform environment, producing a second signal from said direct measurement of said mean radiant temperature which is a function of said mean radiant temperature, combining said first and second signals to produce a third signal which is a function of the average of the sum of said first and second signals and thus is a function of the measured operative temperature within said nonuniform environment, providing a fourth signal which is representative of a set point temperature which which is desired operative temperature within said nonuniform environment, and comparing said third and fourth signals to provide an error signal indicative of the difference therebetween.

* * * * *

UNITED STATES PATENT AND TRADEMARK OFFICE
CERTIFICATE OF CORRECTION

PATENT NO. : 4,863,279
DATED : September 5, 1989
INVENTOR(S) : Morris L. Markel et al It is certified that error appears in the above-identified patent and that said Letters Patent is hereby corrected as shown below:

Column 2, line 37, change "its" to --is--.

Column 3, line 35, change the equation to read:

$$t_o = \frac{h_c}{h_c + h_r}(t_a) + \frac{h_r}{h_c + h_r}(\bar{t}_r)$$

Column 3, line 62, change the equation to read:

$$t_o = \frac{t_a + \bar{t}_r}{2}$$

Column 4, line 1, change "immediatey" to --immediately--.

Column 6, line 66 (claim 9), change "to" to --a--.

Column 8, line 9 (claim 13), change "aid" to --said--.

Signed and Sealed this

Twenty-sixth Day of June, 1990

*Attest:*

HARRY F. MANBECK, JR.

*Attesting Officer*   *Commissioner of Patents and Trademarks*